(12) United States Patent
Moraga et al.

(10) Patent No.: US 12,515,179 B2
(45) Date of Patent: Jan. 6, 2026

(54) EQUIPMENT AND PROCESS FOR LIQUID/GAS REACTION OR MIX

(71) Applicant: ECO2MIX INC., Fresno, CA (US)

(72) Inventors: Waldo Moraga, Santiago (CL); Luis Durand, Con-Con (CL)

( * ) Notice: Subject to any disclaimer, the term of this patent is extended or adjusted under 35 U.S.C. 154(b) by 0 days.

(21) Appl. No.: 15/550,765

(22) PCT Filed: Feb. 10, 2016

(86) PCT No.: PCT/IB2016/050710
§ 371 (c)(1),
(2) Date: Aug. 11, 2017

(87) PCT Pub. No.: WO2016/128915
PCT Pub. Date: Aug. 18, 2016

(65) Prior Publication Data
US 2018/0056250 A1    Mar. 1, 2018

(30) Foreign Application Priority Data

Feb. 11, 2015  (CL) .................................. 2015-00329

(51) Int. Cl.
*B01F 23/237*        (2022.01)
*B01F 23/20*         (2022.01)
(Continued)

(52) U.S. Cl.
CPC .......... *B01F 25/3121* (2022.01); *B01F 23/20* (2022.01); *B01F 23/2323* (2022.01);
(Continued)

(58) Field of Classification Search
CPC ...................... B01F 3/04503; B01F 23/23762
(Continued)

(56) References Cited

U.S. PATENT DOCUMENTS

| 474,413 | A | * | 5/1892 | Schneible | .......... | B01F 3/04808 |
| | | | | | | 261/19 |
| 474,414 | A | * | 5/1892 | Schneilbe | .......... | B01F 3/04269 |
| | | | | | | 261/64.3 |

(Continued)

FOREIGN PATENT DOCUMENTS

| DE | 2030290 | 12/1971 |
| EP | 0211685 A2 | 2/1987 |
| KR | 101376710 B1 | 3/2014 |

OTHER PUBLICATIONS

Search Report for International Patent Application No. PCT/IB2016/050710 mailed Jun. 3, 2016. 4 Pages. International Search Authority INAPI, Santiago, Chile.

*Primary Examiner* — David L Sorkin
(74) *Attorney, Agent, or Firm* — Mark C Jacobs

(57) ABSTRACT

The object of the invention is to achieve a more efficient and complete mix between a liquid and gas by means of a system comprising 4 components in order to carry out a reaction or mixing process that improves the contact, and as a result, the reaction or mixing between a liquid and a gas, followed by a recovery stage of the gas that does not react during the reaction or formation of said mixture. This gas is recycled to the reaction or mixing zone, permitting the improvement of the efficiency and the cost of the reaction or mixing process between the liquid and the gas.

6 Claims, 1 Drawing Sheet

(51) Int. Cl.
  *B01F 23/232* (2022.01)
  *B01F 25/30* (2022.01)
  *B01F 25/312* (2022.01)
  *B01F 35/22* (2022.01)
  *C02F 1/20* (2023.01)
  *C02F 1/68* (2023.01)
  *B01F 101/00* (2022.01)
  *C02F 1/66* (2023.01)

(52) U.S. Cl.
  CPC .......... *B01F 25/30* (2022.01); *B01F 35/2209* (2022.01); *C02F 1/20* (2013.01); *C02F 1/68* (2013.01); *B01F 23/23762* (2022.01); *B01F 2101/305* (2022.01); *C02F 1/66* (2013.01); *C02F 2209/06* (2013.01); *C02F 2209/24* (2013.01)

(58) Field of Classification Search
  USPC .......................... 261/3, DIG. 7; 96/181, 355
  See application file for complete search history.

(56) References Cited

U.S. PATENT DOCUMENTS

| | | | | |
|---|---|---|---|---|
| 1,157,092 | A | * | 10/1915 | Rell ........................ B02C 19/06 |
| | | | | 241/39 |
| 1,789,320 | A | * | 1/1931 | Overbury ................ B01F 7/167 |
| | | | | 366/145 |
| 3,313,093 | A | * | 4/1967 | Guggenberger .... B01F 3/04815 |
| | | | | 96/165 |
| 5,842,600 | A | * | 12/1998 | Singleterry ................ A23L 2/54 |
| | | | | 222/1 |
| 6,280,615 | B1 | | 8/2001 | Phillips et al. |
| 6,530,895 | B1 | | 3/2003 | Keirn |
| 7,537,707 | B2 | | 5/2009 | Criswell et al. |
| 8,177,197 | B1 | | 5/2012 | Ergican |
| 8,567,767 | B2 | * | 10/2013 | Fantappie ............. B01F 5/0688 |
| | | | | 261/79.2 |
| 9,718,035 | B2 | * | 8/2017 | Bandixen .............. B01F 5/0451 |

* cited by examiner

EQUIPMENT AND PROCESS FOR LIQUID/GAS REACTION OR MIX

CROSS REFERENCE TO RELATED APPLICATIONS

This application is a U.S. national application under 35 U.S.C. § 371 of International Patent Application No. PCT/IB2016/050710, filed Feb. 10, 2016, which claims priority to Chilean Patent Application No. CL 2015-00329, filed Feb. 11, 2015, the contents of both of which are incorporated by reference in their entirety.

TECHNICAL FIELD OF THE INVENTION

The current invention refers to an equipment and a process for reacting or mixing a liquid and a gas in order to get a more efficient mixture of these two components. Also, it enables to recover the gas that does not react or mix during the mixing process, and recycle it to the reaction or mixing area, improving the process efficiency.

BACKGROUND OF THE INVENTION

For many years there have been several industrial processes that use a liquid and a gas mix or reaction for different purposes, going from the production of sparkling mineral water, water disinfection, to neutralization of waste waters through the direct contact of a gas and a liquid. These applications present different difficulties, generally related to the same disadvantage, that is for not using completely the gas load in the reaction or mixing process. This produces losses of gas due to not use, and generates an incomplete reaction or mix, where the non-dissolved or reacted gas is not recovered.

Currently, a known application related to the process of reaction or mixture between a gas and a liquid is the use of carbon dioxide to neutralize and/or adjust the pH of alkaline aqueous solutions, replacing strong acids. The known processes that apply $CO_2$ show low efficiency rates, from 20 to 50%, due to the liquid-gas mix not being efficiently developed.

Besides, $CO_2$ bubbles tend to leave the solution naturally, for they are so light, in consequence, a good interaction between the gas and the liquid to create carbonic acid is not achieved.

On the other hand, the larger is the size of a $CO_2$ bubble in an aqueous solution, the more difficult is to produce carbonic acid. At present, to solve these problems, conventional ejectors, which are devices aimed at promoting the mix between $CO_2$ (gas) and the aqueous solution (liquid), are being used. These ejectors are built based on Herschel-type Venturi tubes, originally designed to measure the flow of liquids and gases in a closed pipe or to be used directly as gas injectors.

The objective of the devices developed to improve the creation of carbonic acid is to create smaller bubbles and a more turbulent flow in order to have a complete and efficient gas-liquid bubble mix.

These devices have successfully improved the carbonic acid production, however, there is still a portion of $CO_2$ lost in the process because it does not react or mix with the liquid, and is released as non-reacted bubbles.

In the state of the art, it is possible to find several patents using different technologies which tend to solve the difficulties above mentioned. For example, the document EP0211685, "Ejector, Particularly for the Neutralization of Aqueous Alkaline Solutions by Carbon Dioxide", which teaches that the objective of the invention is to reach efficiency levels, about 90%, through the perfect mix of the two fluids, one at the liquid phase (water), and the other at the gas phase ($CO_2$), incorporating some changes in the conventional Venturi tube. These changes, based on studies about reactions between the liquid and the gas phase, properties of the solutions and their alkaline components, have made possible the development of a new type of ejector, which is the object of said invention. Another document related to the technical field of this invention is DE2030290, "Waste waters treatment by neutralizing in a flow-pipe", which teaches the water reaction to be treated with chemicals needed to adjust pH, carried out in a flow pipe within a process of neutralizing acid and/or alkaline waste waters. The addition and mix of chemicals with water is carried out through an ejector integrated in the flow pipe, and the water is pumped preferably after collecting all the waters to be treated in a pumping recipient. The treated waters go through a final control in the flow pipe, before leaving the channel.

Finally, the document U.S. Pat. No. 7,537,707, "Gas Injector and Method Therefor" teaches a gas injector that can be installed in a less invasive way, which currently uses injection systems of pre-existing gas for plumbing, through pumping, enabling a more efficient gas absorption in water, than the gas injection systems that are currently used.

Instead, the equipment and process of this application enables a liquid and a gas reaction or mixing process, for example in a pH control, through three consecutive stages, starting with a gas injection (A) in two zones, of high and low pressure, continuing with a gas bubbles mixing and pulverization stage (B), and in a final stage (C) with the recovery of the non-reacted or non-mixed gas bubbles, in gaseous state, which is taken to stage A, to be injected in the low pressure zone (2).

Specifically, the present invention relates to a process of a gas and a liquid reaction or mix, through an equipment that has four components to carry out steps that will improve, for example, the water acidification using carbon dioxide ($CO_2$) and forming carbonic acid, which is the product responsible of acidifying the water with a high efficiency percentage in the use of said gas. The present invention will enable to obtain a liquid/gas mix through a safer method for people and the environment, avoiding the use of dangerous chemicals, such as sulfuric acid, etc.

To carry out the method of the present invention, a conventional Venturi-type ejector is used (3) with direct gas injection (1) and gas recovery (2) points, making use of the particular features of the Venturi tube. The equipment comprises a static mixer (5) with segmented propellers rotated in 90° (4), which is used to mix the gas and the liquid, reducing the size of the gas bubbles, thus improving the reaction or mix, for example, forming carbonic acid. Finally, in a gas bubbles recovery device (9), the gas bubbles that were not able to react or mix with the liquid are advantageously recovered to be reinjected in the reacting or mixing process through a pipe (11). The adjustment or regulation of the gas coming into the point (1) is made according to a measurement of the obtained liquid/gas mix, taking a sample of the resultant mix at the point (10), which is measured by a probe adapted to the process, connected to a controller, which, according to the required objective, acts on a regulation valve located at the point (2), enabling the adjustment of the gas injection.

SUMMARY OF THE INVENTION

The current invention consists in an equipment and a process for reaction or mixing a liquid and a gas in order to get a mix more efficient and complete of these two components, enabling also the recovery of the gas that does not react or mix during the process, and recycling it to the initial reaction or mixing area, improving the process efficiency.

BRIEF DESCRIPTION OF THE FIGURES

The Figures herein included are intended to show the principles of the invention.

DESCRIPTION OF THE INVENTION

The objective of the current invention is to get a more efficient and complete mixing process between a liquid and a gas, by means of an equipment that comprises four components to carry out a mixing or reaction process that improves the contact, and therefore the mixing or reaction itself, between a liquid and a gas, followed by a recovery stage of the gas not reacted in the mixing formation or reaction. This gas is recycled to the reaction or mixing area, improving the efficiency and the cost of the process of mixing or reaction between the liquid and the gas.

An embodiment of the invention, without limiting the scope of the same, is the control of pH in systems for farming irrigation, or similar, in order to get lightly acid waters, which will improve the nutrients availability in the plants, during the fertigation process. This kind of waters, lightly acid, with a pH ranging from 6 to 7, similar to the one found in plants sap, allows to improve significantly the nutrient absorption, needed for farming growth and production. Besides, when decreasing the water pH, the sediment or scales in pipelines, micro sprinklers and drippers, are eliminated. The existence of sediment or scales in pipelines is due to most of the waters, for example, those used in Chile, present medium to high hardness values, which turns into the formation of these sediments and scales in pipelines and irrigation means and lines.

More specifically, the invention of the present application proposes a reaction or mixing process between a liquid and a gas, by means of an equipment which controls the pH of the liquid (water), in a harmless way, safe for the environment and the people, increasing the efficiency in the use of the gas ($CO_2$) equal or over than 95%, through a more efficient liquid/gas reaction or mixing process. To accomplish the above objective, the equipment has a recovery component for the gas not absorbed by the liquid be treated during the reaction or mixing process, recycling the gas to the stage (A), in order to get a more efficient reaction or mix, enabling to decrease the operating costs and to increase the gas efficiency.

The equipment used in this process is also an object of the present invention. This equipment comprises four components through which it is possible to get a more efficient reaction or mix, for example, reducing the water pH, by using $CO_2$ gas.

Figure 1:
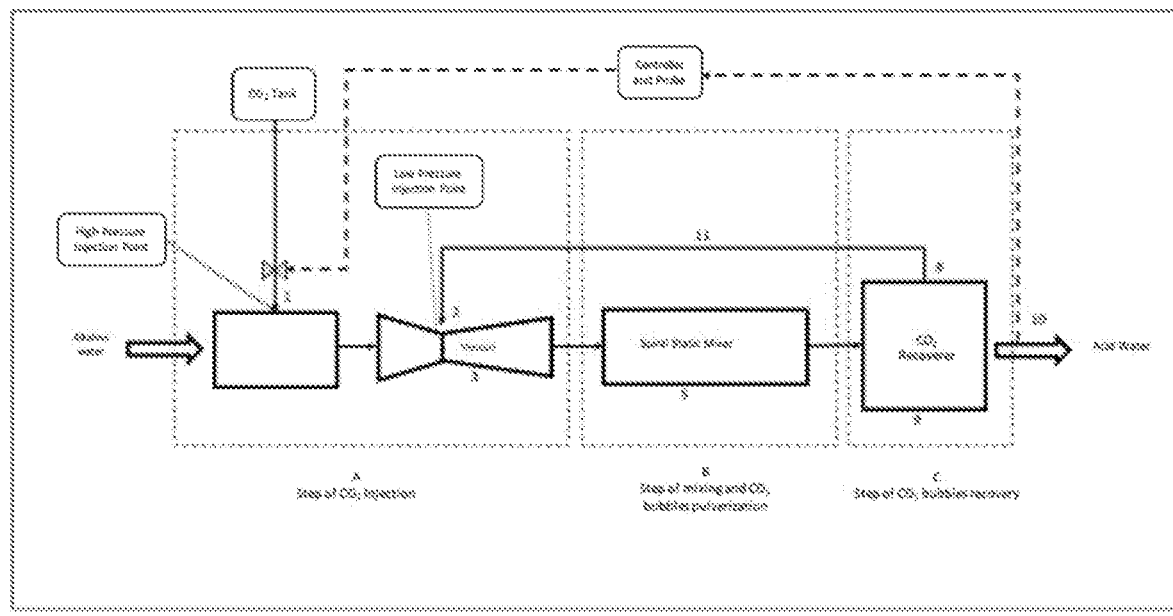
FIG. 1.—shows the stages of liquid/gas reaction or mixing process, according to the current invention.

The process of the present application is shown in FIG. 1, in which the different stages in the liquid/gas reaction or mix and the components involved are established. On one hand, the reaction and creation of a certain compound, carbonic acid, for instance, and on the other hand, the gas recovery, non-reacted $CO_2$, for example, which is returned to the low pressure injection point, increasing the efficiency of the process in the use of the gas in up to 95%, or over.

The conditions proposed in the present invention are based on studies of liquid and gaseous phase reactions, properties fo the solutions and of the alkaline components, which have helped to develop a mixing process to achieve the objective of this application, in which the equipment is formed by several components that work together.

Thus, the present invention provides an equipment comprising the following components: Component 1. —High Pressure Gas injector (Stage A); Component 2. —Low Pressure Injector with a pre mixer (Stage A); Component 3. —Gas Bubble Mixer and Sprayer (Stage B); and Component 4. —Gas Bubble Recovery Recipient (Stage C) which allows the recovered gas be reinjected into Component 2.

The process of the present invention consists in a liquid and a gas reaction or mixing step, which involves two different steps, a reaction step, and a recovery one. The reaction step, such as the water acidification by $CO_2$, uses a conventional or Venturi ejector, adapted to the irrigation system.

The equipment used in the process of the present invention is a static device, i.e. with no moving parts, and spends kinetic energy from the liquid (water) flow. The liquid comes into the cylindrical inlet section of Venturi, and the gas ($CO_2$) (1) is injected from a pressurized and regulated gas storage tank. Then, the liquid is restrained in the bottleneck, in the convergent section of the ejector (3). This produces a decrease in the static pressure and an increase in the velocity of the liquid (water) flow. This decrease in the static pressure (2) is what makes the non-reacted gas in the reaction or mixing process coming from the third Component, to be recovered.

This velocity reaches its highest peak in the narrower diameter section (bottleneck) of the ejector and is determined by the following formula:

$$V = Q/A$$

Where:

V=is the fluid velocity in the cylindrical section of the narrower diameter (bottleneck) of the ejector, in meters per second (m/s).

Q=is the fluid flow through the ejector, in cubic meters per hour ($m^3/h$).

A=is the internal diameter of the cylindrical section (bottleneck) of the narrower diameter of the ejector, in millimeters (mm).

In the state of the art it has been demonstrated that velocities near 17.3 m/s makes a more effective mix. Smaller diameters in gas bubbles, therefore, more liquid/gas interaction, cause a reaction effectiveness of 90±5% in the formation of carbonic acid, according to the following equation of balance:

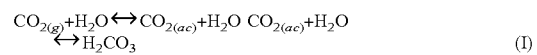

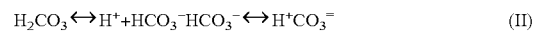

Due to the formation of the micro bubbles during the step of $CO_2$ gas injection, a gas and a liquid pre mix is achieved, resulting in the above described reaction. As the injection is not enough to solubilize $CO_2$, there must be a more effective mix and pulverization zone, in order to produce smaller diameter bubbles, increasing both, the capacity of solubilize the $CO_2$ gas and the reaction velocity.

In Component 4 (9) the gas that does not react with the liquid is recovered, then is taken to Component 2, by means of the pressure decrease occurred in the narrowest part of the Venturi machine (2), where there is a zone or point having a lower pressure than in Component 4, and what is known as gas low-pressure injection zone of Component 2.

This low pressure zone or point of the Venturi is comprised by a decrease of the diameter of the pipeline, and then an expansion of it, to get back to the initial diameter, resulting in a low pressure zone that corresponds to the diameter decrease area, before the expansion and the recovery of the diameter of this pipe.

EXAMPLE OF APPLICATION

Figure 2:
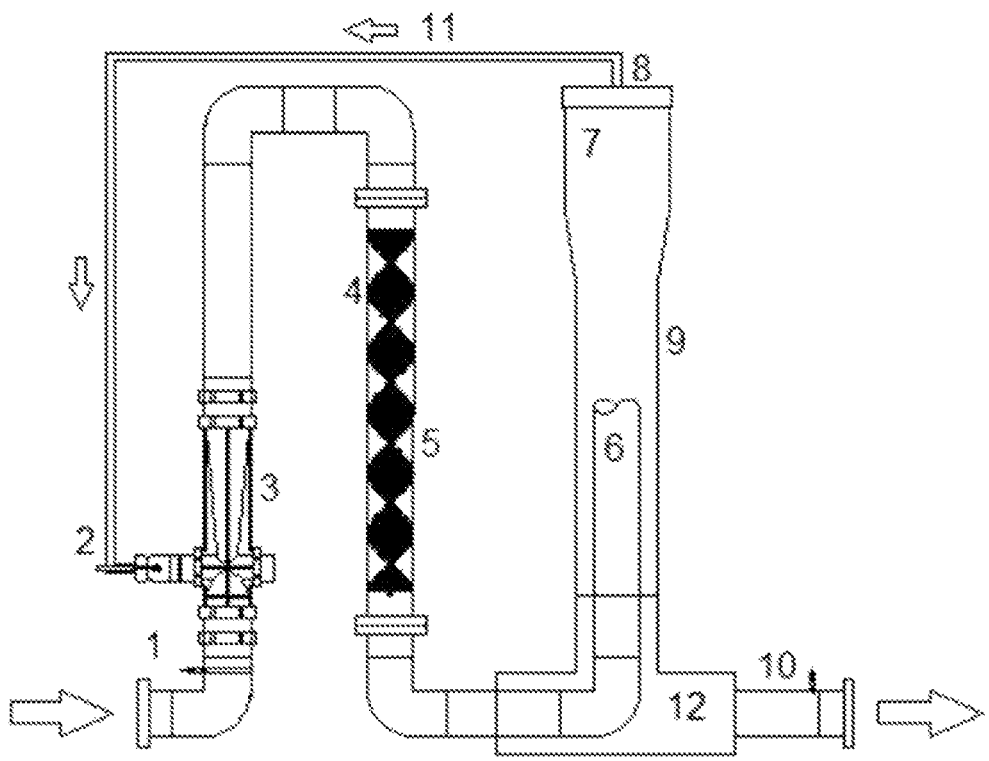
FIG. 2.—shows a detailed view of the main components of the liquid/gas mixing equipment, according to the current invention.

The equipment and process of this invention make it possible to reach efficiency mixing levels equal or over 95%, through a perfect mix of the two fluids, liquid and gas. The reaction or mixing process of the present invention comprises three steps, which will be detailed by the description of FIG. 1, in which the water acidification method with carbon dioxide is represented. The components of the equipment will be also described later (FIG. 2).

Method for Acidification of Water
- A.—Step of $CO_2$ Injection.
- B.—Step of $CO_2$ Bubbles Mix and Pulverization.
- C.—Step of $CO_2$ Bubbles Recovery.

Step 1. —Carbon Dioxide Injection.

Carbon dioxide injection is carried out through two different sources to start with the acidification process that comprises the formation of carbonic acid, which was previously detailed. To achieve this, there is available a $CO_2$ high pressure injection system, i.e., a $CO_2$ high pressure cylinder, which has pressure regulators, connected through a pipe (hose) and adjusted to a pressure 1.1 times over the pressure of the water line. This reaches a small pipe (1) that goes through the main pipeline which has micro holes of 0.5 mm, going in the direction to the water flow, followed by a Conventional Venturi ejector (3), in which the $CO_2$ low pressure injection takes place. In the Venturi ejector there is a convergent zone that boosts the increasing of the fluid velocity, wherein the fluid flows from a section having a higher diameter to a section having a lower diameter, convergent zone or throat. The feature of this throat allows it to get a lower pressure, than the one of the total system. The system pressure depends on the pressure of the pump that is available in the irrigation system, giving a motive power, enough to suck $CO_2$ from the recovery zone. This point is known as $CO_2$ low pressure injection zone (2).

Step 2. —$CO_2$ Mix and Pulverization.

In this stage, there is a mechanical mix, by means of a static mixer (5) which counts with a swirl with several parts (propeller) (4), located at 90° facing each other. The aim of being at an angle of 90° facing each other is to enable to improve the gas and water contact, by decreasing the size of the bubble and the mixing of both fluids, liquid and gas. The initial size of the gas bubble is between 0.6 and 0.4 mm, and because the planes of the propellers are at 90°, they decrease the size under a 50% of the original bubble size. In addition, the gas/liquid reaction or mixing can be improved by changing the direction of the mix, what results in a better contact between the liquid and the gas.

Step 3. —$CO_2$ Bubbles Recovery

In this step, the recovery of the non-reacted $CO_2$ gas is carried out and the same is recycled to the stage 1, the $CO_2$ low pressure injection zone (2).

To be able to recover the $CO_2$ gas (bubbles) and recycle it into step 1, there is a Component 4 (9), whose functioning is based on the liquid direction change, perpendicular to the flow direction towards a wider diameter zone, 30% larger than the main water line. This is achieved by means of a pipe located at 90° that is inserted into a wider diameter chamber, filling the 75% of the total length of the chamber. With this change in the flow direction, the water/$CO_2$ mix is forced to go to the upper area of the chamber with a wider diameter (7). This causes a decrease in the liquid velocity and favours the split of the gas from the liquid. Then, the liquid (water) goes down in the opposite direction of the inlet flow without $CO_2$ gas (12). The $CO_2$ gas is accumulated in the top part of the wider diameter chamber (7), recovered through the outlet section (8), and led to Component 2 by a duct (11), for example a hose, towards the Venturi low pressure zone (2) (Component 2).

EQUIPMENT OF THE INVENTION

Component 1. —High Pressure gas Injector.
Component 2. —Low Pressure gas Injector and Pre-Mixer.
Component 3. —Gas Bubble Mixer and Sprayer.
Component 4. —Gas Bubble Recovery Recipient.

The equipment of the present invention is detailed below, by means of which a 95% increase in the efficiency of the process is achieved.

It comprises a 10 mm pipe (1) that occupies the whole diameter of the inlet pipeline to Venturi, with small holes which deliver micro bubbles of gas into the liquid that converges, accelerating its velocity to generate a turbulent flow.

It comprises another gas injection point, coming from Component 4 (9) and that goes to the low pressure zone, or throat of Venturi (3). The recovered gas is recycled from the top of the recovery chamber (7) and reinjected into the low pressure zone of Venturi (2). In this case, Venturi is used as a motive system, sucking the gas recovered from Component 4, generating a lower pressure point or zone than the one of the system, a typical characteristic of the conventional Venturi. This produces a flow that goes from a higher pressure zone to a lower one, where the gas is recovered, thus, avoiding the non-reacted gas loss, unlike other systems in which the non-mixed or non-reacted gas is not recovered.

It comprises a forced mixing section (5) to enhance the gas and liquid interaction, improving the solubilization of the gas into the liquid, and forming, in a neutralization process for example, carbonic dioxide. This section counts with 6 parts of inverted swirls (4) which improve and help in the gas/liquid interaction, in the water line.

It includes a wider diameter chamber (9) that reduces the velocity of the liquid and of the non-reacted bubbles which go up to the top of the recovery chamber (7), to be led through a duct or a pipe (11) and injected in the Venturi low pressure zone (2).

The invention claimed is:

1. A process for mixing and reacting a liquid and gas which process comprises:
    (A) injecting a gas from a pressurized container source and liquid, together into a high pressure injector, wherein the pressure of the gas exceeds the pressure of the liquid,
    (B) passing the mixture of liquid and gas into a venturi for further mixing,
    (C) passing the mixture of gas and liquid into a static mixer having a series of propellers therein, (D) passing the mixture of undissolved gas and dissolved gas in the liquid, and liquid into a recovery chamber for separation, (E) separating the undissolved gas from the liquid, and the liquid containing dissolved gas, and (F) recycling the undissolved gas separated, directly back into the venturi.

2. The process of claim 1 wherein the process further includes the steps of monitoring and controlling the fluid flow of gas from the pressurized container source into said high pressure injector based upon the amount of undissolved gas coming from the recovery chamber, back into the venturi.

3. The process of claim 1 wherein gas is injected into the high pressure injector at a pressure of 1.1 times the pressure of the liquid entering said injector, and wherein the liquid entering the venturi does it at the known specified speed of the venturi.

4. The process of claim 3 wherein the mixture of liquid and gas passing into the static mixer interact with a series of spaced segmented static propellers to mix the gas and the liquid.

5. The process of claim 1 wherein the gas is carbon dioxide.

6. The process of claim 3 wherein the gas is carbon dioxide.

\* \* \* \* \*